US012199233B2

(12) United States Patent
Kim et al.

(10) Patent No.: US 12,199,233 B2
(45) Date of Patent: Jan. 14, 2025

(54) NON-AQUEOUS ELECTROLYTE SOLUTION AND LITHIUM SECONDARY BATTERY INCLUDING THE SAME

(71) Applicant: LG Energy Solution, Ltd., Seoul (KR)

(72) Inventors: Gwang Yeon Kim, Daejeon (KR); Jeong Woo Oh, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 681 days.

(21) Appl. No.: 17/615,690

(22) PCT Filed: Aug. 27, 2020

(86) PCT No.: PCT/KR2020/011462
§ 371 (c)(1),
(2) Date: Dec. 1, 2021

(87) PCT Pub. No.: WO2021/045443
PCT Pub. Date: Mar. 11, 2021

(65) Prior Publication Data
US 2022/0246976 A1    Aug. 4, 2022

(30) Foreign Application Priority Data

Sep. 3, 2019 (KR) .................. 10-2019-0108783

(51) Int. Cl.
*H01M 10/056* (2010.01)
*H01M 4/02* (2006.01)
*H01M 4/38* (2006.01)
*H01M 4/505* (2010.01)
*H01M 4/525* (2010.01)
*H01M 4/583* (2010.01)
*H01M 10/0525* (2010.01)

(52) U.S. Cl.
CPC ......... *H01M 10/056* (2013.01); *H01M 4/386* (2013.01); *H01M 4/505* (2013.01); *H01M 4/525* (2013.01); *H01M 4/583* (2013.01); *H01M 10/0525* (2013.01); *H01M 2004/027* (2013.01); *H01M 2004/028* (2013.01); *H01M 2300/002* (2013.01); *H01M 2300/004* (2013.01)

(58) Field of Classification Search
None
See application file for complete search history.

(56) References Cited

U.S. PATENT DOCUMENTS

| | | |
|---|---|---|
| 2002/0039677 A1 | 4/2002 | Iwamoto et al. |
| 2012/0171576 A1 | 7/2012 | Tsai et al. |
| 2012/0171579 A1 | 7/2012 | Tsai et al. |
| 2016/0013514 A1* | 1/2016 | Yoshida ............ H01M 10/0565 429/300 |
| 2016/0190650 A1 | 6/2016 | Seo et al. |
| 2016/0211548 A1 | 7/2016 | Jin et al. |
| 2018/0342767 A1 | 11/2018 | Ahn et al. |
| 2019/0058216 A1 | 2/2019 | Oh et al. |
| 2019/0074545 A1 | 3/2019 | Jeong et al. |
| 2019/0198925 A1 | 6/2019 | Lee et al. |
| 2019/0379087 A1 | 12/2019 | Oh et al. |
| 2021/0151800 A1 | 5/2021 | Shin et al. |

FOREIGN PATENT DOCUMENTS

| | | |
|---|---|---|
| CN | 101771167 A | 7/2010 |
| CN | 102074733 A | 5/2011 |
| CN | 107293783 A | 10/2017 |
| EP | 2737501 A1 | 6/2014 |
| JP | H10092221 A | 4/1998 |
| JP | 2001143749 A | 5/2001 |
| JP | 200233124 A | 1/2002 |
| JP | 2014524156 A | 9/2014 |
| JP | 2015225689 A | 12/2015 |
| JP | 2017183093 A | 10/2017 |
| JP | 2021520053 A | 8/2021 |
| KR | 20030066046 A | 8/2003 |
| KR | 20140139442 A | 12/2014 |
| KR | 20160081109 A | 7/2016 |
| KR | 20180026358 A | 3/2018 |
| KR | 20180065958 A | 6/2018 |
| KR | 20180066724 A | 6/2018 |
| KR | 20180083272 A | 7/2018 |
| WO | 2015-035582 A1 | 3/2015 |
| WO | 2018106078 A1 | 6/2018 |
| WO | 2019088733 A1 | 5/2019 |

OTHER PUBLICATIONS

International Search Report for Application No. PCT/KR2020/011462, dated Dec. 7, 2020, 2 pages.
Extended European Search Report for Application No. 20859766.6 dated Jul. 13, 2022, pp. 1-5.

\* cited by examiner

*Primary Examiner* — Haroon S. Sheikh
*Assistant Examiner* — Taeyoung Son
(74) *Attorney, Agent, or Firm* — Lerner David LLP

(57) ABSTRACT

A non-aqueous electrolyte solution and a lithium secondary battery including the same are disclosed herein. In some embodiments, a non-aqueous electrolyte solution includes an organic solvent, a lithium salt, and an oligomer represented by Formula 1 as a surfactant, wherein the organic solvent contains containing cyclic carbonate, dimethyl carbonate, and alkyl formate.

12 Claims, No Drawings

NON-AQUEOUS ELECTROLYTE SOLUTION AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2020/011462, filed on Aug. 27, 2020, which claims priority from Korean Patent Application No. 10-2019-0108783, filed on Sep. 3, 2019, the disclosure of which is incorporated by reference herein.

TECHNICAL FIELD

The present invention relates to a non-aqueous electrolyte solution and a lithium secondary battery including the same, and more particularly, to a non-aqueous electrolyte solution, which may improve rapid charging performance and resistance characteristics of a secondary battery, and a lithium secondary battery including the same.

BACKGROUND ART

A lithium secondary battery is generally prepared by a method in which, after an electrode assembly is formed by disposing a separator between a positive electrode, which includes a positive electrode active material formed of a transition metal oxide containing lithium, and a negative electrode including a negative electrode active material capable of storing lithium ions and the electrode assembly is inserted into a battery case, a non-aqueous electrolyte solution that becomes a medium for transferring the lithium ions is injected thereinto and the battery case is then sealed.

The lithium secondary batteries have not only been used in portable electronic devices such as mobile phones or notebook computers, but have also been used in electric vehicles, and their demand is increasing rapidly. As the demand for lithium secondary batteries increases and application targets are diversified, a performance level required for lithium secondary batteries is gradually increasing. For example, lithium secondary batteries used in electric vehicles require high energy density, high power characteristics, and durability in which the lithium secondary batteries may be used for a long time under severe conditions. In addition, recently, there is an increasing demand for rapid charging performance capable of charging a battery within a short time.

However, lithium secondary batteries developed to date have insufficient rapid charging performance, and, even when rapid charging is possible, there is a limitation in that battery performance is rapidly degraded when the rapid charging is repeated.

DISCLOSURE OF THE INVENTION

Technical Problem

An aspect of the present invention provides a non-aqueous electrolyte solution, which may improve rapid charging performance and resistance characteristics of a lithium secondary battery, and a lithium secondary battery including the same.

Technical Solution

According to an aspect of the present invention, there is provided a non-aqueous electrolyte solution which includes an organic solvent containing cyclic carbonate, dimethyl carbonate, and alkyl formate; a lithium salt; and an oligomer represented by Formula 1 as a surfactant.

[Formula 1]

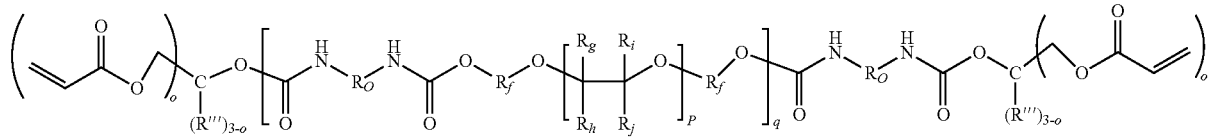

In Formula 1, $R_f$ is an alkylene group having 1 to 5 carbon atoms which is substituted or unsubstituted with at least one fluorine, $R_g$, $R_h$, $R_i$, and $R_j$ are each independently a fluorine element or an alkyl group having 1 to 3 carbon atoms which is substituted or unsubstituted with fluorine, $R_0$ is an aliphatic hydrocarbon group or an aromatic hydrocarbon group, R''' is hydrogen or an alkyl group having 1 to 3 carbon atoms, o is an integer of 1 to 3, and p and q are the numbers of repeating units, wherein p is an integer of 1 to 10, and q is an integer of 1 to 15.

According to another aspect of the present invention, there is provided a lithium secondary battery which includes a positive electrode including a positive electrode active material; a negative electrode including a negative electrode active material; a separator disposed between the negative electrode and the positive electrode; and the non-aqueous electrolyte solution according to the present invention.

Advantageous Effects

If a non-aqueous electrolyte solution of the present invention, which includes an organic solvent containing cyclic carbonate, dimethyl carbonate, and alkyl formate, a lithium salt, and an oligomer having a specific structure as a surfactant, is used, a lithium secondary battery having excellent rapid charging performance and low initial resistance characteristics may be achieved.

MODE FOR CARRYING OUT THE INVENTION

A non-aqueous electrolyte solution according to the present invention includes (1) an organic solvent containing cyclic carbonate, dimethyl carbonate, and alkyl formate, (2) a lithium salt, and (3) a surfactant. Also, the non-aqueous electrolyte solution of the present invention may further include (4) an additive, if necessary.

Hereinafter, each component of the non-aqueous electrolyte solution of the present invention will be described.

(1) Organic Solvent

The non-aqueous electrolyte solution of the present invention includes cyclic carbonate, dimethyl carbonate, and alkyl formate, as an organic solvent.

The cyclic carbonate is an organic solvent which may well dissociate a lithium salt in the electrolyte solution due to high permittivity as a highly viscous organic solvent, wherein, for example, the cyclic carbonate may include at least one selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate. Among them, ethylene carbonate capable of maintaining passivation ability of a stable solid electrolyte interface (SEI) is particularly preferred.

The cyclic carbonate may be included in an amount of 10 vol % to 30 vol %, for example, 15 vol % to 25 vol % based on a total volume of the organic solvent. If the cyclic carbonate is included in an amount of less than 10 vol %, since the SEI is unstable, the passivation ability may not be stably maintained, and, if the cyclic carbonate is included in an amount of greater than 30 vol %, viscosity of the electrolyte solution may increase.

Next, the dimethyl carbonate and the alkyl formate are components for improving rapid charging performance, wherein, since the dimethyl carbonate and alkyl formate have relatively low viscosity and high permittivity, an effect of improving ionic conductivity and lithium ion mobility of the electrolyte solution may be obtained when the dimethyl carbonate and alkyl formate are used.

The dimethyl carbonate may be included in an amount of 40 vol % to 85 vol %, for example, 50 vol % to 80 vol % based on the total volume of the organic solvent. If the dimethyl carbonate is included in an amount of less than 40 vol %, the ionic conductivity and lithium ion mobility of the electrolyte solution may be reduced, and, if the dimethyl carbonate is included in an amount of greater than 85 vol %, a side reaction due to reduction decomposition of the dimethyl carbonate may occur.

The alkyl formate, for example, may be an alkyl formate having 1 to 5 carbon atoms, and, for example, may include at least one selected from the group consisting of methyl formate, ethyl formate, propyl formate, n-butyl formate, and iso-butyl formate.

The alkyl formate may be included in an amount of 5 vol % to 30 vol %, for example, 5 vol % to 20 vol % based on the total volume of the organic solvent. If the alkyl formate is included in an amount of less than 5 vol %, an effect of improving the rapid charging performance is insignificant, and, if the alkyl formate is included in an amount of greater than 30 vol %, a side reaction due to reduction decomposition of the alkyl formate may occur.

(2) Lithium Salt

Various lithium salts typically used in an electrolyte solution for a lithium secondary battery may be used as the lithium salt used in the present invention without limitation. For example, the lithium salt may include $Li^+$ as a cation, and may include at least one selected from the group consisting of $Br^-$, $Cl^-$, $Br^-$, $I^-$, $NO_3^-$, $N(ON)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2N^-$ as an anion.

Specifically, the lithium salt may include at least one selected from the group consisting of LiCl, LiBr, LiI, $LiBF_4$, $LiClO_4$, $LiAlO_4$, $LiAlCl_4$, $LiPF_6$, $LiSbF_6$, $LiAsF_6$, $LiB_{10}Cl_{10}$, LiBOB ($LiB(C_2O_4)_2$), $LiCF_3SO_3$, LiTFSI ($LiN(SO_2CF_3)_2$), LiFSI ($LiN(SO_2F)_2$), $LiCH_3SO_3$, $LiCF_3CO_2$, $LiCH_3CO_2$, and LiBETI ($LiN(SO_2CF_2CF_3)_2$). Specifically, the lithium salt may include a single material selected from the group consisting of $LiBF_4$, $LiClO_4$, $LiPF_6$, LiBOB ($LiB(C_2O_4)_2$), $LiCF_3SO_3$, LiTFSI ($LiN(SO_2CF_3)_2$), and LiBETI ($LiN(SO_2CF_2CF_3)_2$, or a mixture of two or more thereof.

The lithium salt may be included in a concentration of 0.8 M to 4 M, for example, 1.5 M to 3 M in the electrolyte solution. When the concentration of the lithium salt satisfies the above range, output characteristics of the battery may be improved by improving a lithium ion yield ($Li^+$ transference number) and a degree of dissociation of the lithium ions.

(3) Surfactant

The non-aqueous electrolyte solution according to the present invention includes an oligomer represented by Formula 1 as a surfactant.

[Formula 1]

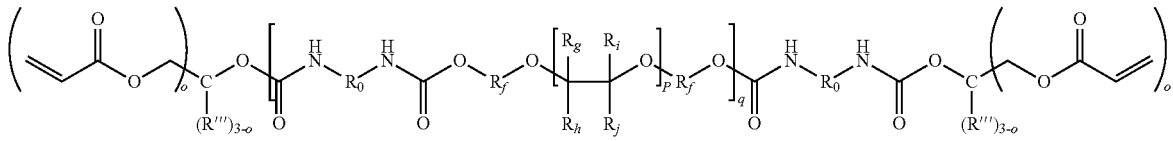

In Formula 1, $R_f$ is an alkylene group having 1 to 5 carbon atoms which is substituted or unsubstituted with at least one fluorine, and is preferably a fluorine-substituted alkylene group having 1 to 5 carbon atoms.

$R_g$, $R_h$, $R_i$, and $R_j$ are each independently a fluorine element or an alkyl group having 1 to 3 carbon atoms which is substituted or unsubstituted with fluorine, and preferably are each independently a fluorine element or a fluorine-substituted alkyl group having 1 to 3 carbon atoms.

$R_0$ is an aliphatic hydrocarbon group or an aromatic hydrocarbon group. Specifically, the aliphatic hydrocarbon group, for example, may include at least one selected from the group consisting of (a) at least one alicyclic hydrocarbon group selected from the group consisting of a substituted or unsubstituted cycloalkylene group having 4 to carbon atoms, a substituted or unsubstituted cycloalkenylene group having 4 to 20 carbon atoms, and a substituted or unsubstituted heterocycloalkylene group having 2 to 20 carbon atoms, and (b) at least one linear hydrocarbon group selected from the group consisting of a substituted or unsubstituted alkylene group having 1 to 20 carbon atoms, a substituted or unsubstituted alkoxylene group having 1 to 20 carbon atoms, a substituted or unsubstituted alkenylene group having 2 to 20 carbon atoms, and a substituted or unsubstituted alkynylene group having 2 to 20 carbon atoms. Also, the aromatic hydrocarbon group may include at least one selected from the group consisting of a substituted or unsubstituted arylene group having 6 to 20 carbon atoms and a substituted or unsubstituted heteroarylene group having 2 to 20 carbon atoms.

R''' is hydrogen or an alkyl group having 1 to 3 carbon atoms.

o is an integer of 1 to 3, and p and q are the numbers of repeating units, wherein p is an integer of 1 to 10, and q is an integer of 1 to 15.

Since the oligomer represented by Formula 1 contains a fluorine-substituted ethylene group, as a hydrophobic part, as well as an acrylate-based functional group, as a hydrophilic group, at both ends, the oligomer represented by Formula 1 may act as a surfactant to obtain an effect of reducing surface resistance between the electrolyte solution and an electrode interface and improving wetting of the battery.

Preferably, the surfactant may be an oligomer represented by Formula 1-1 below.

of the surfactant is excessively small, the effect of improving the wetting may be insignificant, and, if the amount of the surfactant is excessively large, resistance may be increased and ionic conductivity may be reduced because the surfactant acts as an impurity.

(4) Additive

Although not essential, in order to prevent the electrolyte solution from being decomposed to cause collapse of a negative electrode in a high output environment, or further improve low-temperature high-rate discharge characteristics, high-temperature stability, overcharge protection, and a battery swelling suppression effect at high temperatures, the electrolyte solution according to the present invention may further include additives.

Examples of the additive may be at least one selected from the group consisting of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, and a lithium salt-based compound.

[Formula 1-1]

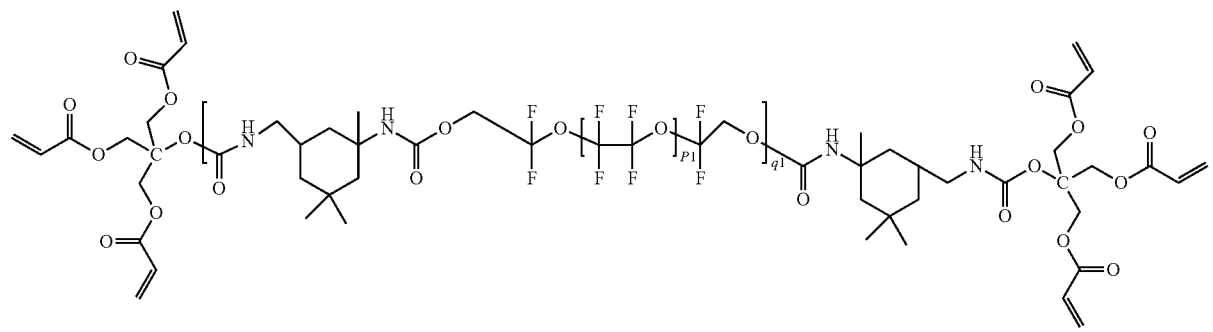

In Formula 1-1, p1 and q1 are the numbers of repeating units, wherein p1 is an integer of 1 to 10, and q1 is an integer of 1 to 15.

A weight-average molecular weight (Mw) of the oligomer represented by Formula 1 may be controlled by the number of repeating units, and may be in a range of about 1,000 g/mol to about 100,000 g/mol, particularly 1,000 g/mol to 50,000 g/mol, and more particularly 1,000 g/mol to 10,000 g/mol. When the weight-average molecular weight of the oligomer satisfies the above range, since affinity with the electrolyte solution is high, the oligomer may be well dissolved in the electrolyte solution. The weight-average molecular weight may denote a standard polystyrene-equivalent value measured by gel permeation chromatography (GPC), and, unless otherwise specified, a molecular weight may denote the weight-average molecular weight. For example, in the present invention, the GPC conditions are as follows: the weight-average molecular weight is measured by using 1200 series by Agilent Technologies, a PL mixed B column by Agilent Technologies may be used in this case, and tetrahydrofuran (THF) may be used as a solvent.

The surfactant may be included in an amount of 0.01 wt % to 5 wt %, preferably 0.1 wt % to 3 wt %, and more preferably 0.1 wt % to 1 wt % based on the total weight of the non-aqueous electrolyte solution. When the amount of the surfactant satisfies the above range, an effect of improving the wetting of the battery may be obtained. If the amount The cyclic carbonate-based compound, for example, may include vinylene carbonate (VC) or vinyl ethylene carbonate.

The halogen-substituted carbonate-based compound, for example, may include fluoroethylene carbonate (FEC).

The sultone-based compound, for example, may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound, for example, may include ethylene sulfate (Esa), trimethylene sulfate (TMS), or methyl trimethylene sulfate (MTMS).

The phosphate-based compound, for example, may include at least one compound selected from the group consisting of lithium difluoro bis(oxalato)phosphate, lithium difluorophosphate, tris(trimethylsilyl) phosphate, tris (trimethylsilyl) phosphite, tris(2,2,2-trifluoroethyl)phosphate, and tris(trifluoroethyl)phosphite.

The borate-based compound, for example, may include tetraphenylborate and lithium oxalyldifluoroborate.

The nitrile-based compound, for example, may include at least one compound selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene-based compound, for example, may include fluorobenzene, the amine-based compound may include triethanolamine or ethylenediamine, and the silane-based compound may include tetravinylsilane.

The lithium salt-based compound is a compound different from the lithium salt included in the non-aqueous electrolyte solution, wherein the lithium salt-based compound may include at least one compound selected from the group consisting of LiPO$_2$F$_2$, LiODFB, LiBOB (lithium bis(oxalato)borate (LiB(C$_2$O$_4$)$_2$)), and LiBF$_4$.

The additives may be used alone or may be used as a mixture of two or more thereof.

Preferably, as the additive, the non-aqueous electrolyte solution of the present invention may include at least one selected from the group consisting of a cyclic carbonate-based compound, a sultone-based compound, a sulfate-based compound, a lithium salt-based compound, and a benzene-based compound, and may more preferably include a cyclic carbonate-based compound, a sultone-based compound, a sulfate-based compound, a lithium salt-based compound, and a benzene-based compound. More preferably, the non-aqueous additive of the present invention may include vinylene carbonate, 1,3-propane sultone, ethylene sulfate, LiBF$_4$, and fluorobenzene.

In a case in which a combination of the additives is included, a stable film may be formed on a positive electrode and a negative electrode at the same time. In this case, since decomposition of the electrolyte may not only be suppressed by the film formed on the negative electrode even under high-temperature and high-pressure conditions, but dissolution of transition metal contained in the positive electrode may also be suppressed by the film formed on the positive electrode, high-temperature and high-pressure properties and stability of the battery may be improved.

A total amount of the additives may be in a range of 1 wt % to 15 wt %, preferably 1 wt % to 12 wt %, and more preferably 1 wt % to 11 wt % based on the total weight of the electrolyte solution. In a case in which the additives are included in an amount with the above range, occurrence of a side reaction during an initial activation process of the secondary battery or remaining or precipitation of the additive may be prevented while a film is stably formed on the electrode and an ignition phenomenon during overcharge may be suppressed.

Lithium Secondary Battery

Next, a lithium secondary battery according to the present invention will be described.

The lithium secondary battery according to the present invention includes a positive electrode, a negative electrode, a separator disposed between the positive electrode and the negative electrode, and a non-aqueous electrolyte solution, and, in this case, the non-aqueous electrolyte solution is the non-aqueous electrolyte solution according to the present invention. Since the non-aqueous electrolyte solution has been described above, a description thereof will be omitted and other components will be described below.

(1) Positive Electrode

The positive electrode according to the present invention may include a positive electrode active material layer including a positive electrode active material, and, if necessary, the positive electrode active material layer may further include a conductive agent and/or a binder.

The positive electrode active material is a compound capable of reversibly intercalating and deintercalating lithium, wherein the positive electrode active material may specifically include a lithium composite metal oxide including lithium and at least one transition metal such as cobalt, manganese, nickel, or aluminum. Specifically, the lithium composite metal oxide may include lithium-manganese-based oxide (e.g., LiMnO$_2$, LiMn$_2$O$_4$, etc.), lithium-cobalt-based oxide (e.g., LiCoO$_2$, etc.), lithium-nickel-based oxide (e.g., LiNiO$_2$, etc.), lithium-nickel-manganese-based oxide (e.g., LiNi$_{1-Y}$Mn$_Y$O$_2$ (where 0<Y<1), LiMn$_{2-Z}$Ni$_Z$O$_4$ (where 0<Z<2)), lithium-nickel-cobalt-based oxide (e.g., LiNi$_{1-Y1}$C$_{Y1}$O$_2$ (where 0<Y1<1)), lithium-manganese-cobalt-based oxide (e.g., LiCo$_{1-Y2}$Mn$_{Y2}$O$_2$ (where 0<Y2<1), LiMn$_{2-Z1}$Co$_{Z1}$O$_4$ (where 0<Z1<2)), lithium-nickel-manganese-cobalt-based oxide (e.g., Li(Ni$_p$Co$_q$Mn$_{r1}$)O$_2$ (where 0<p<1, 0<q<1, 0<r1<1, and p+q+r1=1) or Li(Ni$_{p1}$Co$_{q1}$Mn$_{r2}$)O$_4$ (where 0<p1<2, 0<q1<2, 0<r2<2, and p1+q1+r2=2), or lithium-nickel-cobalt-transition metal (M) oxide (e.g., Li(Ni$_{p2}$Co$_{q2}$Mn$_{r3}$M$_{S2}$)O$_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<S2<1, and p2+q2+r3+S2=1), and any one thereof or a compound of two or more thereof may be included.

Specifically, the lithium composite metal oxide may be a lithium composite transition metal oxide having an amount of nickel among transition metals of 70 atm % or more, and, more specifically, may be a lithium nickel cobalt manganese-based oxide represented by Formula A below.

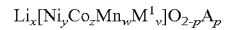

$$\text{Li}_x[\text{Ni}_y\text{Co}_z\text{Mn}_w\text{M}^1{}_v]\text{O}_{2-p}\text{A}_p \qquad [\text{Formula A}]$$

In Formula A, M$^1$ is a doping element substituted for transition metal sites and may include at least one element selected from the group consisting of tungsten (W), copper (Cu), iron (Fe), vanadium (V), chromium (Cr), titanium (Ti), zirconium (Zr), zinc (Zn), aluminum (Al), indium (In), tantalum (Ta), yttrium (Y), lanthanum (La), strontium (Sr), gallium (Ga), scandium (Sc), gadolinium (Gd), samarium (Sm), calcium (Ca), cerium (Ce), niobium (Nb), magnesium (Mg), boron (B), and molybdenum (Mo).

A is an element substituted for oxygen sites and may include at least one element selected from the group consisting of fluorine (F), chlorine (Cl), bromine (Br), iodine (I), astatine (At), and sulfur (S).

x represents an atomic ratio of lithium to total transition metals in the lithium nickel cobalt manganese-based oxide, wherein x may be in a range of 0.8 to 1.2, for example, 1 to 1.2.

y represents an atomic ratio of nickel among the transition metals in the lithium nickel cobalt manganese-based oxide, wherein y is in a range of 0.7 or more to less than 1, preferably 0.75 to less than 1, and more preferably 0.75 to 0.98. Since higher capacity may be achieved as an amount of the nickel among the transition metals is increased, that the atomic ratio of the nickel is 0.7 or more is more advantageous for achieving high capacity.

z represents an atomic ratio of cobalt among the transition metals in the lithium nickel cobalt manganese-based oxide, wherein z is in a range of greater than 0 to less than 0.3, preferably 0.01 or more to less than 0.3, and more preferably 0.01 or more to less than 0.25.

w represents an atomic ratio of manganese among the transition metals in the lithium nickel cobalt manganese-based oxide, wherein w is in a range of greater than 0 to less than 0.3, preferably 0.01 or more to less than 0.3, and more preferably 0.01 or more to less than 0.25.

v represents an atomic ratio of the doping element M$^1$ doped into the transition metal sites in the lithium nickel cobalt manganese-based oxide, wherein v may be in a range of 0 to 0.2, for example, 0 to 0.1. In a case in which the doping element $M^1$ is added, there is an effect of improving structural stability of the lithium nickel cobalt manganese-based oxide, but, since capacity may be reduced when the amount of the doping element is increased, it is desirable that the doping element is included at an atomic ratio of 0.2 or less.

p represents an atomic ratio of the element A substituted for the oxygen sites, wherein p may be in a range of 0 to 0.2, for example, 0 to 0.1.

In Formula A, y+z+w+v=1.

Specific examples of the lithium nickel cobalt manganese-based oxide may be $LiNi_{0.8}Co_{0.1}Mn_{0.1}O_2$ and the like, but the lithium nickel cobalt manganese-based oxide is not limited thereto.

The positive electrode active material may be included in an amount of 80 wt % to 98 wt %, for example, 85 wt % to 98 wt % based on a total weight of the positive electrode active material layer. When the positive electrode active material is included in an amount within the above range, excellent capacity characteristics may be exhibited.

Next, the conductive agent is used to provide conductivity to the electrode, wherein any conductive agent may be used without particular limitation as long as it has suitable electron conductivity without causing adverse chemical changes in the battery.

Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used.

The conductive agent may be included in an amount of 0.1 wt % to 10 wt %, for example, 0.1 wt % to 5 wt % based on the total weight of the positive electrode active material layer.

Next, the binder improves the adhesion between the positive electrode active material particles and the adhesion between the positive electrode active material and a current collector.

Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt %, for example, 0.1 wt % to 10 wt % based on the total weight of the positive electrode active material layer.

The positive electrode of the present invention as described above may be prepared by a method of preparing a positive electrode which is known in the art. For example, the positive electrode may be prepared by a method in which a positive electrode collector is coated with a positive electrode slurry, which is prepared by dissolving or dispersing the positive electrode active material, the binder, and/or the conductive agent in a solvent, dried, and then rolled, or a method in which the positive electrode slurry is cast on a separate support, and a film separated from the support is then laminated on the positive electrode collector.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 µm to 500 µm, and microscopic irregularities may be formed on the surface of the collector to improve the adhesion of the positive electrode material. The positive electrode collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the positive electrode material mixture may be adjusted to have an appropriate viscosity in consideration of a coating thickness of the positive electrode material mixture, manufacturing yield, and workability, and is not particularly limited.

(2) Negative Electrode

Next, a negative electrode will be described.

The negative electrode according to the present invention includes a negative electrode active material layer including a negative electrode active material, and the negative electrode active material layer may further include a conductive agent and/or a binder, if necessary.

As the negative electrode active material, various negative electrode active materials used in the art, for example, a carbon-based negative electrode active material, a silicon-based negative electrode active material, or a metal alloy may be used.

According to an embodiment, the negative electrode active material may include a carbon-based negative electrode active material, and, as the carbon-based negative electrode active material, various carbon-based negative electrode active materials used in the art, for example, a graphite-based materials such as natural graphite, artificial graphite, and Kish graphite; pyrolytic carbon, mesophase pitch based carbon fiber, meso-carbon microbeads, mesophase pitches, high-temperature sintered carbon such as petroleum or coal tar pitch derived cokes, soft carbon, and hard carbon may be used. A shape of the carbon-based negative electrode active material is not particularly limited, and materials of various shapes, such as an irregular shape, planar shape, flaky shape, spherical shape, or fibrous shape, may be used.

Preferably, the carbon-based negative electrode active material may include at least one of natural graphite and artificial graphite. More preferably, the carbon-based negative electrode active material may include natural graphite and artificial graphite. In a case in which the natural graphite and the artificial graphite are used together, adhesion with the current collector may be increased to suppress exfoliation of the active material.

According to another embodiment, the negative electrode active material may include a carbon-based negative electrode active material and a silicon-based negative electrode active material.

Specific examples of the carbon-based negative electrode active material are the same as described above.

The silicon-based negative electrode active material may include at least one selected from the group consisting of metallic silicon (Si), silicon oxide ($SiO_x$, where $0<x\leq 2$), silicon carbide (SiC), and a Si—Y alloy (where Y is an element selected from the group consisting of alkali metal, alkaline earth metal, a Group 13 element, a Group 14 element, transition metal, a rare earth element, and a combination thereof, and is not Si). The element Y may be selected from the group consisting of Mg, Ca, Sr, barium (Ba), radium (Ra), Sc, Y, Ti, Zr, hafnium (Hf), rutherfordium (Rf), V, Nb, Ta, dubidium (Db), Cr, Mo, W, seaborgium (Sg), technetium (Tc), rhenium (Re), bohrium (Bh), Fe, lead (Pb), ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, Ga, tin (Sn), In, germanium (Ge), phosphorus (P), arsenic (As), antimony (Sb), bismuth (Bi), S, selenium (Se), tellurium (Te), polonium (Po), and a combination thereof.

Since the silicon-based negative electrode active material has higher capacity characteristics than the carbon-based negative electrode active material, better capacity characteristics may be obtained when the silicon-based negative electrode active material is further included.

A mixing ratio of the silicon-based negative electrode active material the carbon-based negative electrode active material may be in a range of 1:99 to 50:50, for example, 5:95 to 30:70, as a weight ratio. In a case in which the mixing ratio of the silicon-based negative electrode active material to the carbon-based negative electrode active material satisfies the above range, since a volume expansion of the silicon-based negative electrode active material is suppressed while capacity characteristics are improved, excellent cycle performance may be secured.

The negative electrode active material may be included in an amount of 80 wt % to 99 wt % based on a total weight of the negative electrode active material layer. In a case in which the amount of the negative electrode active material satisfies the above range, excellent capacity characteristics and electrochemical properties may be obtained.

Next, the conductive agent is a component for further improving conductivity of the negative electrode active material, wherein the conductive agent may be added in an amount of 10 wt % or less, for example, 5 wt % or less based on the total weight of the negative electrode active material layer. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The binder is a component that assists in the binding between the conductive agent, the active material, and the current collector, wherein the binder is commonly added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene polymer (EPDM), a sulfonated EPDM, a styrene-butadiene rubber, a nitrile-butadiene rubber, a fluoro rubber, and various copolymers thereof.

The negative electrode may be prepared by a method of preparing a negative electrode which is known in the art. For example, the negative electrode may be prepared by a method in which a negative electrode collector is coated with a negative electrode slurry, which is prepared by dissolving or dispersing the negative electrode active material as well as selectively the binder and the conductive agent in a solvent, rolled and dried, or may be prepared by casting the negative electrode slurry on a separate support and then laminating a film separated from the support on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. The negative electrode collector may typically have a thickness of 3 μm to 500 μm, and, similar to the positive electrode collector, microscopic irregularities may be formed on the surface of the collector to improve the adhesion of the negative electrode active material. The negative electrode collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the negative electrode slurry may be adjusted to have an appropriate viscosity in consideration of a coating thickness of the negative electrode material mixture, manufacturing yield, and workability, and is not particularly limited.

(3) Separator

The lithium secondary battery according to the present invention includes a separator between the positive electrode and the negative electrode.

The separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used.

Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

The lithium secondary battery according to the present invention as described above may be suitably used in portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples.

Example 1

(Non-Aqueous Electrolyte Solution Preparation)

After $LiPF_6$ was added to a non-aqueous organic solvent, in which ethylene carbonate (EC), methyl formate (MF), and dimethyl carbonate (DMC) were mixed in a volume ratio of 20:20:60, such that a concentration of the $LiPF_6$ was 1.5 M, a non-aqueous electrolyte solution was prepared by adding 0.5 wt % of the compound of Formula 1-1 (Mw=5,000 g/mol, p1=5, q1=3), as a surfactant, and 3 wt % of vinylene carbonate, 0.5 wt % of 1,3-propane sultone, 1 wt % of ethylene sulfate, 0.2 wt % of $LiBF_4$, and 6 wt % of fluorobenzene, as an additive.

(Positive Electrode Preparation)

A lithium nickel-manganese-cobalt-based oxide ($LiNi_{0.8}Co_{0.1}Mn_{0.1}O_2$; NCM811) as positive electrode active material particles, carbon black as a conductive agent, and polyvinylidene fluoride (PVDF), as a binder, were added to N-methyl-2-pyrrolidone (NMP), as a solvent, at a weight ratio of 97.7:0.3:2 to prepare a positive electrode active material slurry. A 20 μm thick positive electrode collector (Al thin film) was coated with the positive electrode active material slurry, dried, and roll-pressed to prepare a positive electrode.

(Negative Electrode Preparation)

A negative electrode active material (artificial graphite: SiO=95:5 weight ratio), PVDF as a binder, and carbon black, as a conductive agent, were added to NMP, as a solvent, at a weight ratio of 97:0.5:2.5 to prepare a negative electrode active material slurry. A 10 μm thick negative electrode collector (Cu thin film) was coated with the negative electrode active material slurry, dried, and roll-pressed to prepare a negative electrode.

(Secondary Battery Preparation)

After an electrode assembly was prepared by a conventional method of sequentially stacking a polyethylene porous film with the positive electrode and negative electrode prepared by the above-described methods, the electrode assembly was put in a pouch-type secondary battery case, and the above-prepared non-aqueous electrolyte solution was injected thereinto to prepare a lithium secondary battery.

Example 2

A non-aqueous electrolyte solution and a lithium secondary battery were prepared in the same manner as in Example 1 except that a non-aqueous organic solvent, in which ethylene carbonate (EC), methyl formate (MF), and dimethyl carbonate (DMC) were mixed in a volume ratio of 20:10:70, was used.

Example 3

A non-aqueous electrolyte solution and a lithium secondary battery were prepared in the same manner as in Example 1 except that a non-aqueous organic solvent, in which ethylene carbonate (EC), methyl formate (MF), and dimethyl carbonate (DMC) were mixed in a volume ratio of 20:15:65, was used.

Example 4

A non-aqueous electrolyte solution and a lithium secondary battery were prepared in the same manner as in Example 1 except that 0.3 wt % of the compound of Formula 1-1 (Mw=5,000 g/mol, p1=5, q1=3) was added as a surfactant.

Comparative Example 1

A non-aqueous electrolyte solution and a lithium secondary battery were prepared in the same manner as in Example 1 except that a non-aqueous organic solvent, in which ethylene carbonate and ethyl methyl carbonate were mixed in a volume ratio of 30:70, was used.

Comparative Example 2

A non-aqueous electrolyte solution and a lithium secondary battery were prepared in the same manner as in Example 1 except that $LiPF_6$ and LiFSI were added to a non-aqueous organic solvent, in which ethylene carbonate and ethyl methyl carbonate were mixed in a volume ratio of 30:70, such that concentrations of the $LiPF_6$ and LiFSI were 0.7 M and 0.3 M, respectively.

Comparative Example 3

A non-aqueous electrolyte solution and a lithium secondary battery were prepared in the same manner as in Example 1 except that a surfactant was not added.

Comparative Example 4

A non-aqueous electrolyte solution and a lithium secondary battery were prepared in the same manner as in Example 1 except that a non-aqueous organic solvent, in which ethylene carbonate and dimethyl carbonate were mixed in a volume ratio of 20:80, was used.

Experimental Example 1: Initial Resistance Evaluation

After each of the lithium secondary batteries prepared by Examples 1 to 4 and Comparative Examples 1 to 4 was subjected to a formation process at a rate of 0.1 C for 3 hours at 25° C., initial charge and discharge were performed at a rate of 0.33 C/a voltage of 2.5 V to 4.2 V at 25° C. Subsequently, at a state of charge (SOC) of 50%, direct current internal resistance (DCIR) at room temperature of each secondary battery was measured by using a voltage difference generated by discharging the battery at a rate of 2.5 C for 10 seconds at room temperature (25° C.). Measurement results are presented in [Table 1] below.

|  | Initial resistance (mohm) |
| --- | --- |
| Example 1 | 40.5 |
| Example 2 | 39.3 |
| Example 3 | 39.9 |
| Example 4 | 40.2 |
| Comparative Example 1 | 47.6 |
| Comparative Example 2 | 41.5 |
| Comparative Example 3 | 43.8 |
| Comparative Example 4 | 45.3 |

Referring to Table 1, it may be confirmed that the secondary batteries of Examples 1 to 4 using the non-aqueous electrolyte solution of the present invention had lower initial resistance than the secondary batteries of Comparative Examples 1 to 4.

Experimental Example 2: Rapid Charging Performance Evaluation

After initial capacity of each of the lithium secondary batteries prepared by Examples 1 to 4 and Comparative Examples 1 to 4 was measured, each lithium secondary battery at a state of charge (SOC) of 8% was charged while a C-rate was changed according to the SOC as listed in Table 2 below, and a voltage value was checked at 1 second intervals for each charging range to measure a voltage profile.

Thereafter, charge was recorded when charged in a constant current/constant voltage (CC/CV) mode by setting a termination condition with the voltage value for each range obtained in the CC mode and end time set in each range at a C-rate which was set for each SOC range from a SOC of 8% to 80% at room temperature (25° C.). Each lithium secondary battery was again discharged to a SOC of 8% at 0.33 C in a CC mode. The above charging and discharging were set as one cycle, charge capacity was measured after 10 cycles, {charge capacity measured after 10 cycles/initial charge capacity}×100 was evaluated as rapid charging capacity retention (%), and measurement results are presented in Table 3 below.

TABLE 2

|  | Charging time (sec) | C-rate (C) |
| --- | --- | --- |
| SOC 8%~19% | 120 | 3.3 |
| SOC 19%~21% | 23 | 3.2 |
| SOC 21%~23% | 23 | 3.1 |
| SOC 23%~26% | 36 | 3 |
| SOC 26%~30% | 51 | 2.8 |
| SOC 30%~32% | 27 | 2.7 |
| SOC 32%~34% | 28 | 2.6 |
| SOC 34%~39% | 75 | 2.4 |
| SOC 39%~44% | 78 | 2.3 |
| SOC 44%~50% | 108 | 2 |
| SOC 50%~57% | 158 | 1.6 |
| SOC 57%~63% | 144 | 1.5 |
| SOC 63%~70% | 229 | 1.1 |
| SOC 70%~80% | 450 | 0.8 |

TABLE 3

|  | Rapid charging capacity retention (%) |
| --- | --- |
| Example 1 | 99.5 |
| Example 2 | 99.1 |
| Example 3 | 99.4 |
| Example 4 | 99.3 |
| Comparative Example 1 | Not operated |
| Comparative Example 2 | Not operated |
| Comparative Example 3 | 98.5 |
| Comparative Example 4 | 97.7 |

As illustrated in Table 3, with respect to the secondary batteries of Examples 1 to 4 using the non-aqueous electrolyte solution of the present invention, rapid charging capacity retentions were excellent at 99% or more.

In contrast, with respect to Comparative Examples 1 and 2 using the non-aqueous electrolyte solution not containing dimethyl carbonate as an electrolyte solution organic solvent, the secondary batteries were not operated after rapid charge, and, with respect to Comparative Example 3 using the non-aqueous electrolyte solution not containing a surfactant and Comparative Example 4 using the non-aqueous electrolyte solution not containing alkyl formate, it may be confirmed that capacity was significantly reduced after rapid charge in comparison to the examples.

Experimental Example 3: Ionic Conductivity

Ionic conductivities were respectively measured at 25° C., 0° C., and −10° C. using a Seven Excellence 5700 instrument by METTLER TOLEDO. Specifically, each of the non-aqueous electrolyte solutions prepared by Examples 1 to 4 and Comparative Examples 1 to 4 was filled in a bath so that a probe for measuring ionic conductivity was immersed in the bath, and the ionic conductivity was then measured through the immersed probe. The measured ionic conductivity values are presented in Table 4 below.

TABLE 4

|  | Ionic conductivity | | |
| --- | --- | --- | --- |
|  | 25° C. | 0° C. | −10° C. |
| Example 1 | 13.56 | 7.94 | 5.73 |
| Example 2 | 12.21 | 7.01 | 5.19 |
| Example 3 | 12.83 | 7.43 | 5.47 |
| Example 4 | 13.61 | 7.96 | 5.75 |
| Comparative Example 1 | 7.27 | 3.38 | 2.41 |
| Comparative Example 2 | 8.15 | 4.73 | 3.56 |
| Comparative Example 3 | 13.83 | 7.99 | 5.83 |
| Comparative Example 4 | 11.21 | 6.35 | 4.53 |

As illustrated in Table 4, with respect to the electrolyte solutions of Examples 1 to 4, ionic conductivities both at room temperature and low temperature were better than those of the non-aqueous electrolyte solutions of Comparative Examples 1, 2, and 4. With respect to Comparative Example 3 not containing a surfactant, ionic conductivity was equivalent to that of the present invention, but initial resistance was high and rapid charging characteristics were degraded.

The invention claimed is:

1. A non-aqueous electrolyte solution, comprising:
an organic solvent containing cyclic carbonate, dimethyl carbonate, and alkyl formate;
a lithium salt; and
an oligomer represented by Formula 1 as a surfactant

[Formula 1]

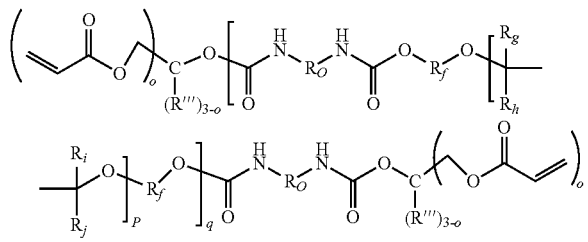

wherein, in Formula 1,
$R_f$ is an alkylene group having 1 to 5 carbon atoms which is unsubstituted or substituted with at least one fluorine,
$R_g$, $R_h$, $R_i$, and $R_j$ are each independently fluorine or an alkyl group having 1 to 3 carbon atoms which is unsubstituted or substituted with fluorine,
$R_o$ is an aliphatic hydrocarbon group or an aromatic hydrocarbon group,
R''' is hydrogen or an alkyl group having 1 to 3 carbon atoms,
o is an integer of 1 to 3,
p is an integer of 1 to 10, and
q is an integer of 1 to 15.

2. The non-aqueous electrolyte solution of claim 1, wherein the organic solvent comprises 10 vol % to 30 vol % of the cyclic carbonate, 40 vol % to 85 vol % of the dimethyl carbonate, and 5 vol % to 30 vol % of the alkyl formate.

3. The non-aqueous electrolyte solution of claim 1, wherein the organic solvent comprises 15 vol % to 25 vol % of the cyclic carbonate, 50 vol % to 80 vol % of the dimethyl carbonate, and 5 vol % to 20 vol % of the alkyl formate.

4. The non-aqueous electrolyte solution of claim 1, wherein the alkyl formate comprises at least one selected from the group consisting of methyl formate, ethyl formate, propyl formate, n-butyl formate, and iso-butyl formate.

5. The non-aqueous electrolyte solution of claim 1, wherein the oligomer represented by Formula 1 is an oligomer represented by Formula 1-1 wherein, in Formula 1-1,
p1 is an integer of 1 to 10, and
q1 is an integer of 1 to 15.

6. The non-aqueous electrolyte solution of claim 1, wherein the surfactant is present in an amount of 0.01 wt % to 5 wt % based on a total weight of the non-aqueous electrolyte solution.

7. The non-aqueous electrolyte solution of claim 1, further comprising at least one additive selected from the group consisting of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, and a lithium salt-based compound.

8. The non-aqueous electrolyte solution of claim 1, further comprising an additive, wherein the additive comprises a cyclic carbonate-based compound, a sultone-based compound, a sulfate-based compound, a lithium salt-based compound, and a benzene-based compound.

9. A lithium secondary battery comprising:
a positive electrode including a positive electrode active material;
a negative electrode including a negative electrode active material;
a separator disposed between the negative electrode and the positive electrode; and
the non-aqueous electrolyte solution of claim 1.

10. The lithium secondary battery of claim 9, wherein the positive electrode active material is a lithium composite transition metal oxide represented by Formula A, $$Li_x[Ni_yCo_zMn_wM1_v]O_2-pA_p$$ [Formula A]

wherein, in Formula A,
M1 comprises at least one element selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo,
A comprises at least one element selected from the group consisting of F, Cl, Br, I, At and S, and $0.8 \leq x \leq 1.2$, $0.7 \leq y < 1$, $0 < z < 0.3$, $0 < w < 0.3$, $0 \leq v \leq 0.2$, and $0 \leq p \leq 0.2$.

11. The lithium secondary battery of claim 9, wherein the negative electrode active material comprises a carbon-based negative electrode active material and a silicon-based negative electrode active material.

[Formula 1-1]

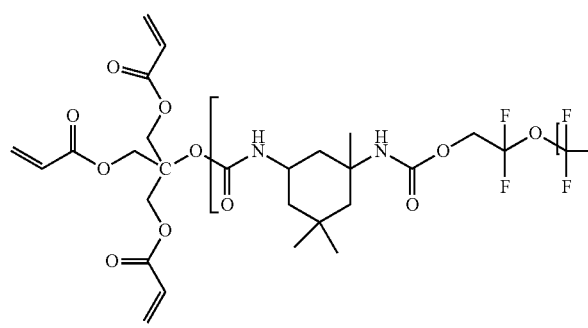
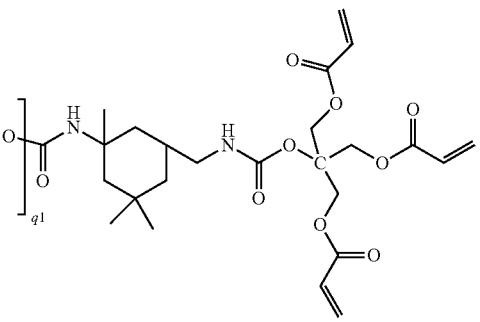

12. The lithium secondary battery of claim 11, wherein the carbon-based negative electrode active material and the silicon-based negative electrode active material are present in a weight ratio of 99:1 to 50:50.

\* \* \* \* \*